US008982384B2

(12) United States Patent
Evanitsky

(10) Patent No.: US 8,982,384 B2
(45) Date of Patent: Mar. 17, 2015

(54) METHODS AND SYSTEMS FOR BROKERING PRINTING DEVICE CAPACITY

(75) Inventor: Eugene S. Evanitsky, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 855 days.

(21) Appl. No.: 13/030,393

(22) Filed: Feb. 18, 2011

(65) Prior Publication Data
US 2012/0212768 A1 Aug. 23, 2012

(51) Int. Cl.
G06F 3/12 (2006.01)
H04L 29/08 (2006.01)

(52) U.S. Cl.
CPC ............ *G06F 3/1204* (2013.01); *G06F 3/1205* (2013.01); *G06F 3/1227* (2013.01); *G06F 3/126* (2013.01); *G06F 3/1287* (2013.01); *G06F 3/1288* (2013.01); *H04L 67/2809* (2013.01); *G06F 3/1217* (2013.01)
USPC .......... 358/1.15; 358/1.16; 709/203; 709/228

(58) Field of Classification Search
CPC ... G06F 3/1205; G06F 3/1272; G06F 3/1291; G06F 3/126
USPC .......................................... 707/200
See application file for complete search history.

(56) References Cited

U.S. PATENT DOCUMENTS

| 6,259,405 | B1 * | 7/2001 | Stewart et al. ................. 342/457 |
| 6,405,178 | B1 * | 6/2002 | Manchala et al. ............... 705/29 |
| 6,407,820 | B1 * | 6/2002 | Hansen et al. ................ 358/1.15 |
| 6,411,314 | B1 * | 6/2002 | Hansen et al. ................ 358/1.15 |
| 6,414,635 | B1 * | 7/2002 | Stewart et al. ................. 342/457 |
| 6,462,756 | B1 * | 10/2002 | Hansen et al. ................ 358/1.15 |
| 6,509,974 | B1 * | 1/2003 | Hansen ......................... 358/1.15 |
| 6,943,905 | B2 | 9/2005 | Ferlitsch |
| 7,003,723 | B1 * | 2/2006 | Kremer et al. ................ 358/1.15 |
| 7,031,004 | B1 * | 4/2006 | Hayward et al. ............. 358/1.15 |
| 7,125,179 | B1 * | 10/2006 | Rai et al. ....................... 358/1.15 |
| 7,587,336 | B1 * | 9/2009 | Wallgren et al. ............. 358/1.15 |
| 8,386,945 | B1 * | 2/2013 | Hansen et al. ................ 358/3.15 |
| 2001/0021311 | A1 * | 9/2001 | Mizumo ........................ 396/429 |
| 2001/0043346 | A1 * | 11/2001 | Roztocil et al. ................ 358/1.9 |
| 2002/0129081 | A1 * | 9/2002 | Rai et al. ....................... 709/102 |
| 2002/0138557 | A1 * | 9/2002 | Mukaiyama et al. ......... 709/203 |
| 2002/0161830 | A1 * | 10/2002 | Mukaiyama et al. ......... 709/203 |
| 2002/0161831 | A1 * | 10/2002 | Nakaoka et al. ............. 709/203 |
| 2002/0184137 | A1 * | 12/2002 | Oakeson et al. ................ 705/37 |
| 2002/0184240 | A1 * | 12/2002 | Volkoff et al. ................ 707/200 |
| 2002/0184294 | A1 * | 12/2002 | Volkoff et al. ................ 709/104 |
| 2002/0184518 | A1 * | 12/2002 | Foster et al. .................. 713/200 |
| 2002/0186408 | A1 * | 12/2002 | Nakaoka et al. ............. 358/1.15 |

(Continued)

*Primary Examiner* — Nicholas Pachol
(74) *Attorney, Agent, or Firm* — Fox Rothschild LLP

(57) ABSTRACT

Methods and systems of brokering printing device capacity are disclosed. A broker computing system including one or more broker computing devices receives a print request including one or more print parameters from a print requester computing device and availability information from one or more print supplier printing devices. The broker computing device selects one of the one or more print supplier printing devices based on the one or more print parameters and the availability information for the selected print supplier printing device. The print request may be transmitted to the selected print supplier printing device. Alternately, a link for the selected print supplier printing device may be transmitted to the print requester computing device. The link enables the print requester computing device to directly contact the print supplier printing device.

18 Claims, 5 Drawing Sheets

(56) References Cited

U.S. PATENT DOCUMENTS

| | | | |
|---|---|---|---|
| 2002/0194245 A1* | 12/2002 | Simpson et al. | 709/101 |
| 2003/0086108 A1* | 5/2003 | Barkis | 358/1.13 |
| 2003/0117638 A1* | 6/2003 | Ferlitsch | 358/1.13 |
| 2003/0218770 A1 | 11/2003 | Field | |
| 2004/0008366 A1 | 1/2004 | Ferlitsch | |
| 2004/0193748 A1* | 9/2004 | Sugimoto | 710/15 |
| 2004/0196491 A1* | 10/2004 | Uchino | 358/1.15 |
| 2005/0036159 A1* | 2/2005 | Sharma et al. | 358/1.9 |
| 2005/0036171 A1* | 2/2005 | Bala et al. | 358/2.1 |
| 2007/0019233 A1* | 1/2007 | Rai et al. | 358/1.15 |
| 2007/0027990 A1* | 2/2007 | Nakaoka et al. | 709/226 |
| 2007/0229879 A1* | 10/2007 | Harmon et al. | 358/1.15 |
| 2007/0229880 A1* | 10/2007 | Harmon et al. | 358/1.15 |
| 2007/0229895 A1* | 10/2007 | Fujimori et al. | 358/1.16 |
| 2007/0229896 A1* | 10/2007 | Fujimori et al. | 358/1.16 |
| 2007/0236725 A1* | 10/2007 | Harmon et al. | 358/1.15 |
| 2008/0030758 A1* | 2/2008 | Snyderman et al. | 358/1.13 |
| 2008/0030766 A1* | 2/2008 | Snyderman et al. | 358/1.15 |
| 2008/0030767 A1* | 2/2008 | Snyderman et al. | 358/1.15 |
| 2008/0030768 A1* | 2/2008 | Snyderman et al. | 358/1.15 |
| 2008/0147872 A1* | 6/2008 | Regnier | 709/230 |
| 2008/0148279 A1* | 6/2008 | Regnier | 719/313 |
| 2009/0040554 A1* | 2/2009 | Burke et al. | 358/1.15 |
| 2010/0053644 A1* | 3/2010 | French et al. | 358/1.9 |
| 2010/0157368 A1* | 6/2010 | Harmon et al. | 358/1.15 |
| 2010/0188700 A1* | 7/2010 | Fujimori et al. | 358/1.15 |
| 2010/0225958 A1* | 9/2010 | Selvaraj et al. | 358/1.15 |
| 2010/0225959 A1* | 9/2010 | Selvaraj et al. | 358/1.15 |

* cited by examiner

METHODS AND SYSTEMS FOR BROKERING PRINTING DEVICE CAPACITY

BACKGROUND

Small businesses, home businesses, individuals, travelers and others have a need to print high quality documents from time to time. However, capital restrictions, printer availability or other issues can prevent them from buying or having access to the necessary equipment to prepare documents of the required quality or type. For example, a small business may prepare certain types of documents requiring special formatting or capabilities only on an irregular or intermittent basis. Purchasing a printing device capable of making such documents may not be cost effective for such a business. Similarly, a business traveler may need to print a presentation while out of the office, but may not have access to a printing device capable of preparing the presentation.

Some businesses have printing devices that can perform a variety of capabilities, but are not fully utilized. For example, a business may have a color printing device or some other printing device that it does not use to full capacity. As such, the business may have paid for a printing device that it is not fully utilizing and would like to identify ways to utilize the printing device more fully and/or to obtain additional revenue by using the printing device for additional purposes.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a broker computing system includes a processor and a processor-readable storage medium in operable communication with the processor. The broker computing system is in operable communication with and remote from one or more print requester computing devices and one or more print supplier printing devices, which are each associated with a corresponding print supplier. The one or more print supplier printing devices are remote from the one or more print requester computing devices. The processor-readable storage medium contains one or more programming instructions that, when executed, cause the processor to receive a print request including one or more print parameters from a print requester computing device, receive availability information from at least one print supplier printing device, select a print supplier printing device based on the one or more print parameters and the availability for the selected print supplier printing device, and transmit the print request to the selected print supplier printing device.

In an embodiment, a broker computing system includes a processor and a processor-readable storage medium in operable communication with the processor. The broker computing system is in operable communication with and remote from one or more print requester computing devices and one or more print supplier printing devices, which are each associated with a corresponding print supplier. The one or more print supplier printing devices are remote from the one or more print requester computing devices. The processor-readable storage medium contains one or more programming instructions that, when executed, cause the processor to receive a print request including one or more print parameters from a print requester computing device, receive availability information from at least one print supplier printing device, select a print supplier printing device based on the one or more print parameters and the availability for the selected print supplier printing device, and transmit a link for the selected print supplier printing device to the print requester computing device. The link enables the print requester computing device to directly contact the print supplier printing device.

In an embodiment, a method of brokering printing device capacity may include receiving a print request including one or more print parameters from a print requester computing device, receiving availability information from one or more print supplier printing devices, selecting, by a broker computing device, one of the one or more print supplier printing devices based on the one or more print parameters and the availability information for the selected print supplier printing device, and transmitting the print request to the selected print supplier printing device.

In an embodiment, a method of brokering printing device capacity may include receiving a print request including one or more print parameters from a print requester computing device, receiving availability information from one or more print supplier printing devices, selecting, by a broker computing device, one of the one or more print supplier printing devices based on the one or more print parameters and the availability information for the selected print supplier printing device, and transmitting a link for the selected print supplier printing device to the print requester computing device. The link enables the print requester computing device to directly contact the print supplier printing device.

DETAILED DESCRIPTION

Figure 1:
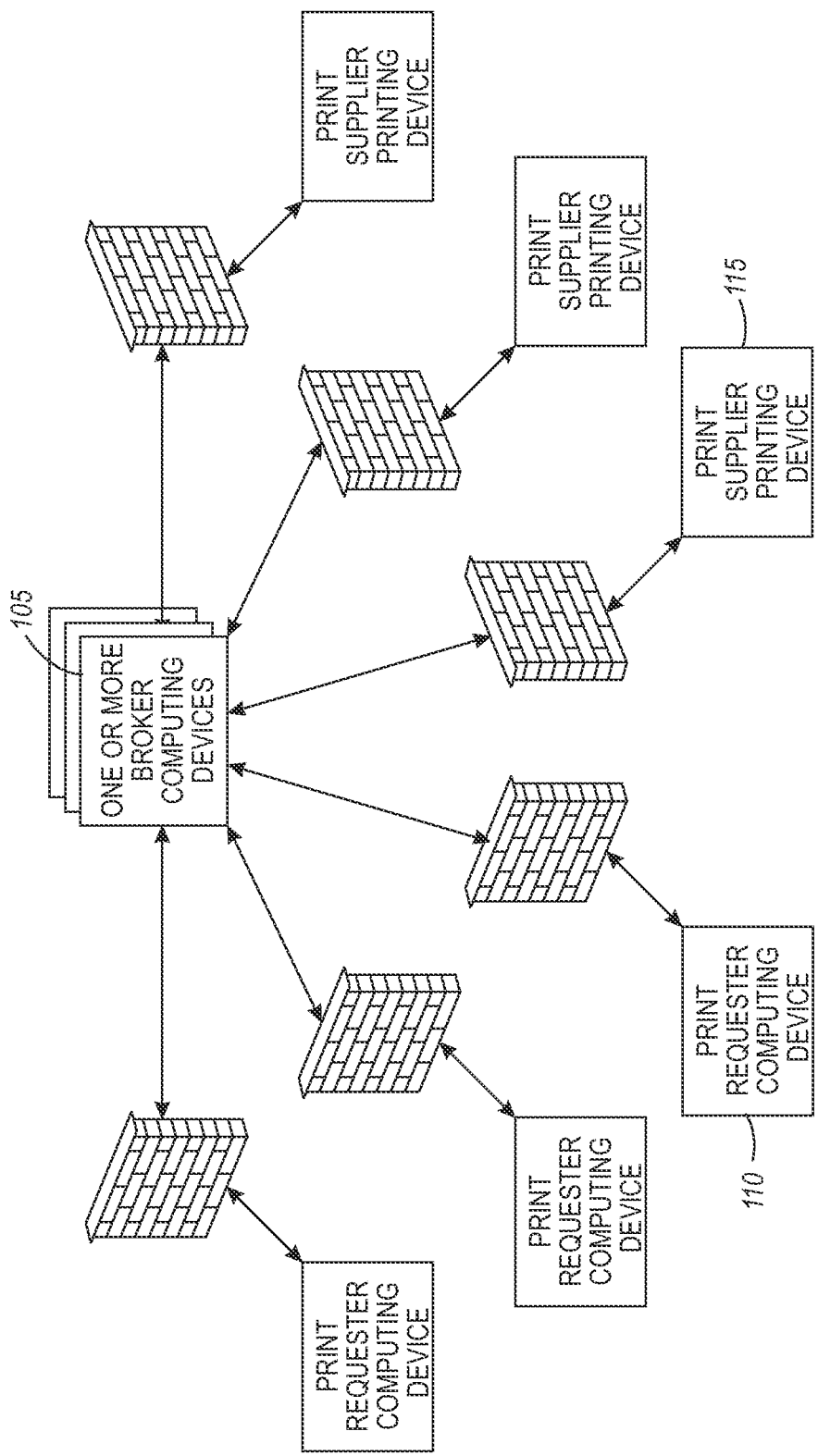
FIGS. 1 and 2 depict block diagrams of exemplary systems for brokering printing device capacity according to respective embodiments.

The following terms shall have, for the purposes of this application, the respective meanings set forth below.

A "computing device" or a "processor" refers to a computer or other machine that performs one or more operations according to one or more programming instructions. An exemplary computing device or processor is described in reference to FIG. 5.

A "print job" refers to a sequence of operations that are performed to prepare one or more documents using one or more printing devices. Exemplary operations may include printing, cutting, binding, and/or the like.

A "broker" refers to an operator of a system that receives print requests for print jobs to be completed from third parties and transmits such print jobs to printing devices operated by third parties. The broker may perform additional services for third parties within the scope of this disclosure, including maintaining billing records and administrating billing and crediting operations for print requesters and print suppliers, identifying and routing print job requests to print suppliers, and the like. A "broker computing device" refers to a computing device operated by a broker for performing one or more of such services. In general, a "broker computing system" includes one or more broker computing devices that perform services for print requesters and print suppliers.

A "print requester" refers to an individual or business that submits a request to have a document prepared to a broker. A "print requester computing device" refers to a computing device operated by a print requester. A print requester computing device may include a desktop computer, a laptop computer, a mobile device, such as a smart phone or Blackberry® by Research in Motion or other handheld device, a wearable computer or similar devices.

A "printing device" refers to a device capable of performing one or more print-related functions. For example, a printing device may include a printer, a scanner, a copy machine, a multifunction device, a collator, a binder, a cutter or other similar equipment. A "multifunction device" is a device that is capable of performing two or more distinct print-related functions. For example, a multifunction device may have print and scan capabilities.

A "print supplier" may refer to an owner or operator of a printing device that is capable of performing print jobs. The print supplier may also distribute print jobs, such as sending or delivering one or more completed documents to a print requester or other third party upon completion of a print job. A "print supplier printing device" is a printing device operated by a print supplier. The print supplier may additionally have an existing infrastructure of personnel, supplies and/or business partners capable of providing completed print jobs to a print requester or any other third party. As used herein, a print supplier explicitly does not include a business that is exclusively or primarily dedicated to processing and delivering print jobs to third parties.

A "credit" refers to compensation provided to a print supplier for preparing a print job on behalf of a print requester. The credit may be provided in the form of a cash payment, a reimbursement, a deduction and/or the like. Credits are provided to print suppliers as incentive to complete print jobs satisfactorily on behalf of print requesters.

A "finishing option" refers to a post-printing operation performed when preparing a document. A finishing option may include cutting, binding, stapling, hole-punching, laminating, and/or any similar operation performed on a document.

A "link" refers to a means to directly access a remote print supplier printing device or a computing device in operable communication with a print supplier printing device. In an embodiment, a link may include an Internet Protocol (IP) address or other designation that permits direct access to an Internet-connected device. A link may further include one or more designations, such as pass codes or passwords, for enabling the print requester to bypass firewall protections implemented by a print supplier. Other methods of providing a "link" may also be performed within the scope of this disclosure.

The term "remote," as used herein with respect to computing devices and/or printing devices, refers to devices that operate on different computer networks and/or computer networks operated by different entities. For example, a computing device is remote from a printing device if the computing device is connected to a first LAN operated by a first entity and the printing device is connected to a second LAN operated by a second entity.

FIG. 1 depicts a block diagram of an exemplary system for brokering printing device capacity according to an embodiment. As shown in FIG. 1, one or more broker computing devices 105 used to implement a broker computing system may be in operable communication with one or more print requester computing devices, such as 110, and one or more print supplier printing devices, such as 115. Each print supplier printing device may be associated with a print supplier.

The one or more broker computing devices 105 may be remote from each print requester computing device 110 and each print supplier printing device 115. In an embodiment, the one or more broker computing devices 105 may reside on a different computer network than a print requester computing device 110. For example, the one or more broker computing devices 105 may be separated from each print requester computing device 110 and each print supplier printing device 115 by a firewall. Furthermore, the one or more broker computing devices 105 may reside on a different computer network than a print supplier printing device. In addition, the one or more print supplier printing devices 115 may be remote from a print requester computing device 110. In an embodiment, at least one broker computing device 105 may be remote from at least one other broker computing device.

The one or more broker computing devices 105 may perform a plurality of operations. In particular, the one or more broker computing devices 105 may perform operations with respect to print requesters associated with print requester computing devices 110, print suppliers associated with print supplier printing devices 115, receiving and analyzing print job submissions to the broker computing device and transmitting print job submissions from the broker computing device to a print supplier printing device, and performing payment processing operations for such print job submissions.

For example, the one or more broker computing devices 105 may register a print requester computing device 110 (or a print requester), store preference information and one or more payment methods received from the print requester computing device (or the print requester), and receive print provider evaluations regarding the quality of service provided by a print supplier. Registration of a print requester computing device 110 (or a print requester) may include qualifying a user by verifying that they can pay for services provided by print suppliers, setting up a payment method for paying for provided services, receiving geographic limitations for print suppliers providing services, and/or receiving a list of excluded print suppliers. Additional and/or alternate services may be provided and/or additional and/or alternate information may be stored by the one or more broker computing devices 105 with respect to a print requester computing device 110 or a print requester within the scope of this disclosure.

The one or more broker computing devices 105 may further register a print supplier printing device 115 (or a print supplier), store preference and/or policy information received from a print supplier for the print supplier printing device, store a customer block list identifying print requesters from whom the print supplier will not accept print job submissions, store payment receipt information (i.e., financial account information or the like), and maintain reporting and business analysis information.

Registration of a print supplier may include qualification of the print supplier to verify that the print supplier can reliably provide print-related services to print requesters. The print supplier may choose to register specific print supplier printing devices 115 that will be made available to print requesters. As such a list of printing devices may be provided to the one or more broker computing devices 105 during the registration process. In addition, a print supplier may submit a number of policies for acceptance of a job, such as a maximum or minimum print job size, a print job complexity, one or more constraints (for example, constraints may include monochrome only, standard stock, no illicit or pornographic print materials, no finishing requirements other than staples, and/or any other constraint), hours of operation, public access points for pick up of completed print jobs, security algorithms, a block list of specific print requesters, and a preferred payment method.

The reporting and business analysis information may include, without limitation, information regarding the usage of the print supplier printing device, savings resulting from participation in the program, tax reporting tools, a guide to equipment layout, a guide to efficiently enabling print requesters to receive completed print jobs, partnership arrangements for shipping completed print jobs or providing additional finishing operations for a print job, and the like. Additional and/or alternate services may be provided and/or additional and/or alternate information may be stored by the one or more broker computing devices 105 with respect to a print supplier printing device 110 or a print supplier within the scope of this disclosure.

The one or more broker computing devices 105 may also enable a print requester computing device 110 to submit a print job to the one or more broker computing devices for completion by a print supplier printing device 115. In an embodiment, the one or more broker computing devices 105 may perform job analysis and cost determinations, match print supplier options with print preferences for the received print job, determine whether print supplier printing devices 115 are available, and perform job monitoring and completion notification to the print requester computing device 110 that submitted the print job. In an embodiment, the one or more broker computing devices 105 may perform raster image processing (RIP) prior to submission to the print supplier printing device 115. Additional and/or alternate operations may be performed within the scope of this disclosure.

Figure 2:
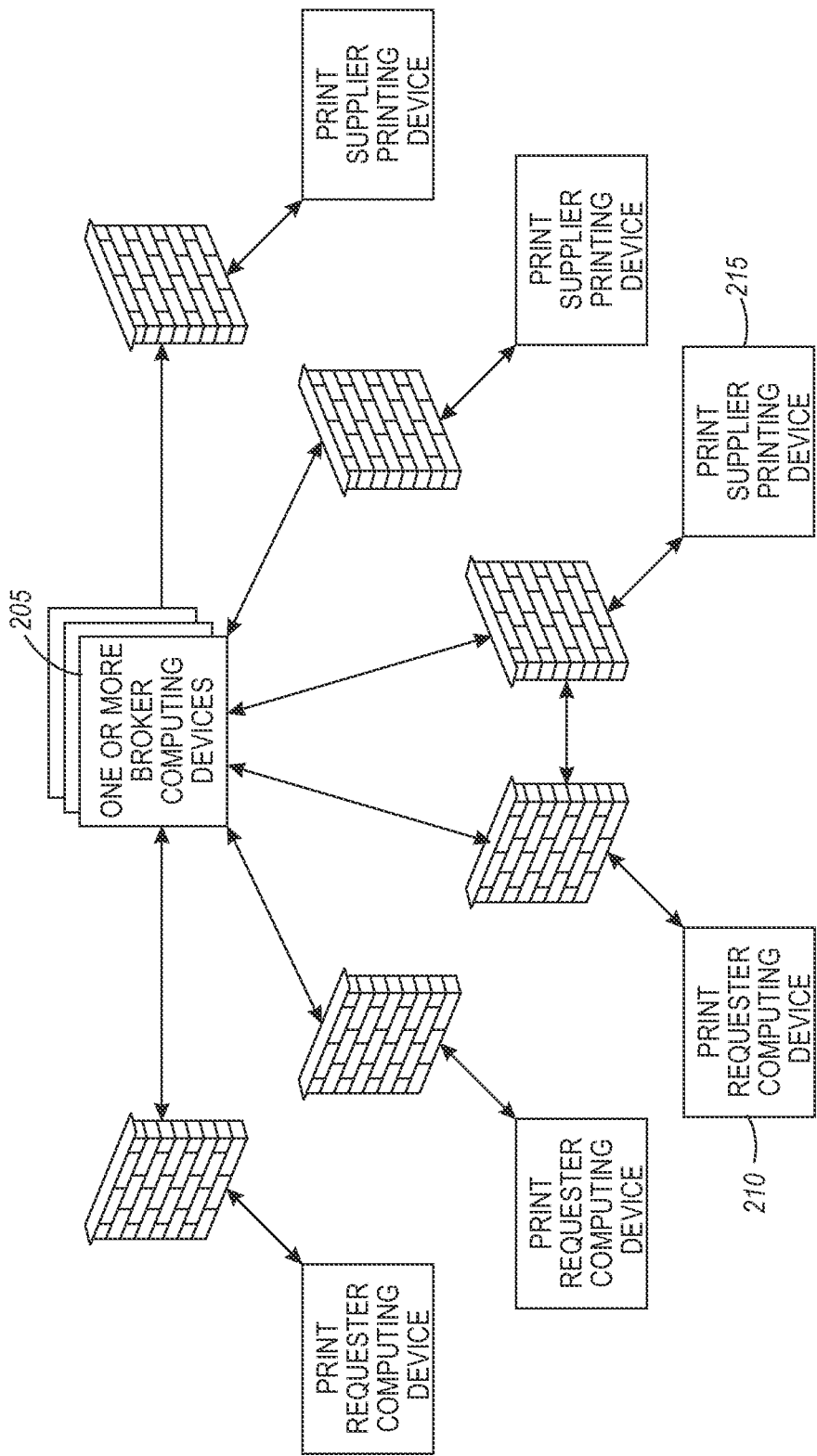

FIG. 2 depicts a block diagram of an alternate exemplary system for brokering printing device capacity according to an embodiment. As shown in FIG. 2, one or more broker computing devices 205 may be in operable communication with one or more print requester computing devices, such as 210, and one or more print supplier printing devices, such as 215. Each print supplier printing device may be associated with a print supplier.

The arrangement of the one or more broker computing devices 205, the one or more print requester computing devices 210 and the one or more print supplier printing devices 215 may be substantially similar to that described above in reference to FIG. 1. However, instead of the one or more broker computing devices 205 submitting a print job to a print supplier printing device 215 for completion, the one or more broker computing devices may instead provide a link to the print requester computing device 210. The link may then be used by the print requester computing device 210 to directly access an internet-enabled print supplier printing device 215. In such an embodiment, a print job may not be received by the one or more broker computing devices 205. Rather, parameters for the print job may be received instead and used to determine an appropriate print supplier printing device 215 for which a link is forwarded to a print requester computing device 210.

Figure 3:
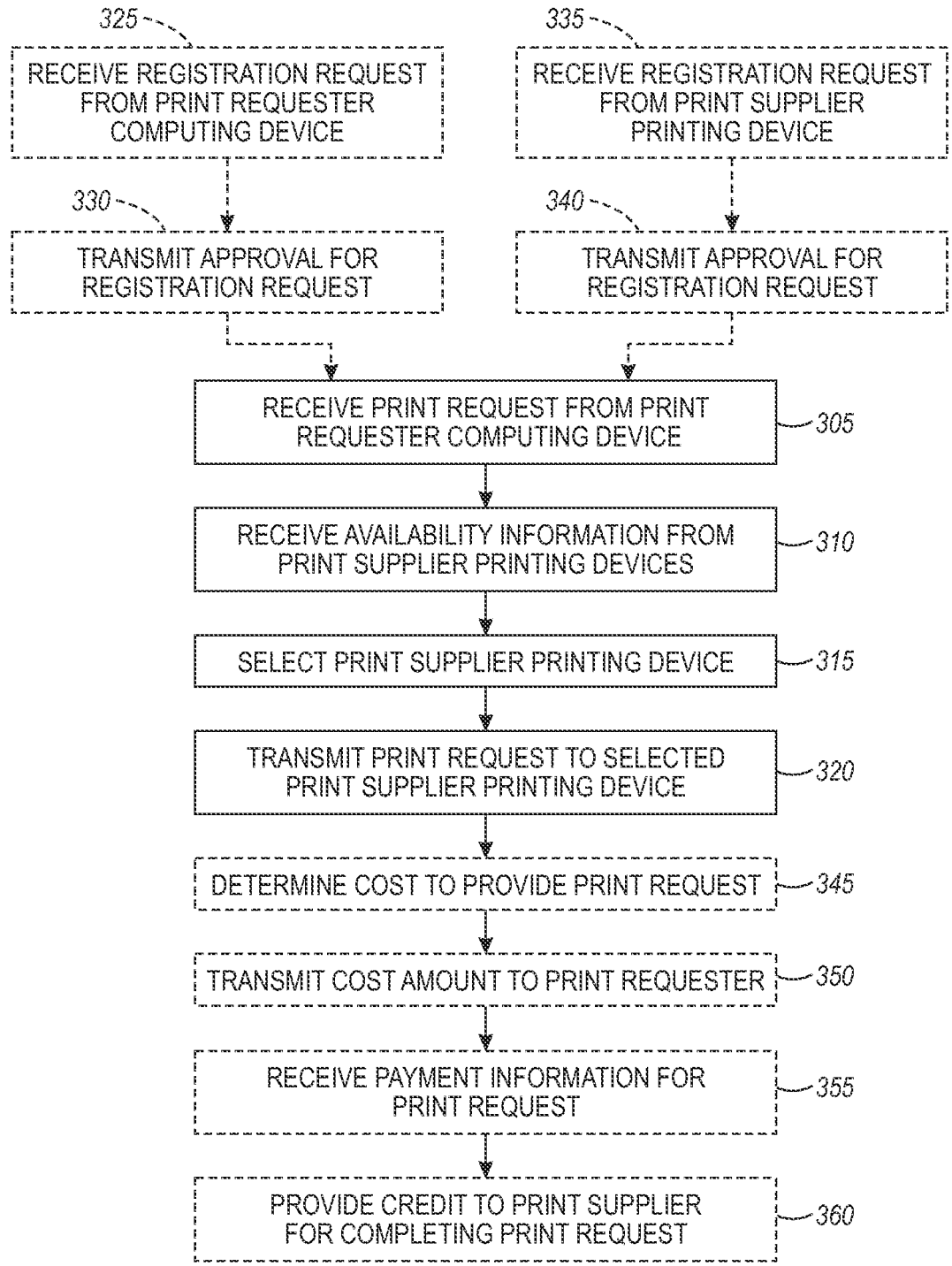
FIGS. 3 and 4 depict flow diagrams of exemplary methods of brokering printing device capacity according to respective embodiments.

FIG. 3 depicts a flow diagram of an exemplary method of brokering printing device capacity according to an embodiment. As shown in FIG. 3, a print request may be received 305 by a broker computing device from a print requester computing device. The print request may include one or more print parameters. The one or more print parameters may include, for example and without limitation, a geographical location, a due date or time, a method of payment, a print job size, a print job quality, and one or more finishing options. In an embodiment, the geographical limitation may refer to one or more of a location of a print requester computing device, a location of a print requester, a location at which a print requester would like to receive one or more documents resulting from the print request, or a destination to which to ship one or more documents resulting from the print request. The due date or time may refer to a date or time by which the print request must be completed, delivered, received by the print requester and/or received at a destination. A method of payment may refer to a manner in which payment for processing and performing the print request will be made. In an embodiment, the print requester may pay the broker. The print job size may refer to a number of impressions or pages for a print job. A print job quality may refer to a resolution, color/monochrome characteristic, a number of colors (3-color printing, 4-color printing, 6-color printing, etc.) or the like. The one or more finishing options may include spiral binding, stapling, hardback binding or the like.

Availability information may also be received 310 by the broker computing device from one or more print supplier printing devices. In an embodiment, the broker computing device may poll one or more print supplier printing devices. In an embodiment, the broker computing device may poll only print supplier printing devices that can satisfy the print parameters. In an embodiment, the broker computing device may store availability information received from print supplier printing device and compare the availability information with the print parameters when a print request is received 305. In an embodiment, availability information may pertain to excess capability for a print supplier printing device, available supplies, such as media, required ink or toner, and/or the like, an ability to meet specified quality metrics for the particular print request, whether the print supplier is equipped to handle one or more output requirements, such as shipping the resulting one or more documents to a third party, the relative time requirements for performing the print request, and/or the like. Alternate methods of determining availability of one or more print supplier printing devices may be performed within the scope of this disclosure.

One of the one or more print supplier printing devices may be selected 315 based on the one or more print parameters and the availability information for the selected print supplier printing device. In an embodiment, the broker computing device may provide a list of one or more of the one or more print supplier printing devices to the print requester and may receive a selection of one of the one or more print supplier printing devices from the print requester. The selection from the print requester may be used to select 315 the print supplier printing device. In an alternate embodiment, the broker computing device may automatically select 315 the print supplier printing device based on the print parameters and the availability information for the print supplier printing device without additional input from the print requester. Alternate methods of selecting a print supplier printing device may be performed within the scope of this disclosure.

The print request may be transmitted 320 to the selected print supplier printing device. The broker computing device may transmit one or more of the print parameters provided as part of the submission to the selected print supplier printing device.

In an embodiment, a registration request may be received 325 by the broker computing device from a print requester computing device. The registration request may comprise a preferred payment method, one or more default user preferences and one or more preferred print suppliers. In an embodiment, the default user preferences may include one or more of a geographical location, a standard print job size, a default print job quality, and one or more default finishing options. An approval for the registration request may be transmitted 330 to the print requester computing device upon approval of the print requester as a valid user for the broker computing device service. In an embodiment, the approval may be transmitted 330 by the broker computing device.

In an embodiment, a registration request may be received 335 by the broker computing device from a print supplier associated with a print supplier printing device. The registration request may comprise one or more policies regarding use of the print supplier printing device. For example and without limitation, the print supplier may choose to register specific print supplier printing devices that will be made available to print requesters. As such, a list of printing devices may be provided to the broker computing device as part of the registration request. In addition, a print supplier may submit a number of policies for acceptance of a job, such as a maximum or minimum print job size or a range of print job sizes, a print job complexity which the print supplier printing device is able to process, one or more constraints (for example, constraints may include monochrome only, standard stock, no illicit or pornographic print materials, no finishing requirements other than staples, and/or any other constraint), hours of operation, public access points for pick up of completed print jobs, security algorithms, a block list of specific print requesters, a preferred payment method, one or more acceptable print job types, one or more methods of enabling a print requester to receive one or more documents resulting from a completed print job, and/or the like. An approval for the registration request may be transmitted 340 to the print supplier upon approval of the print supplier as a valid supplier for the broker computing device service. In an embodiment, the approval may be transmitted 340 by the broker computing device.

In an embodiment, a cost for the print request may be determined 345 based on the one or more print parameters. In an embodiment, the cost may be determined 345 by the broker computing device. The cost may account for the materials, wear and tear on a printing device and labor required to produce one or more documents for the print request. The cost may further include a cost of shipping the one or more documents to a receiving location or other shipping, handling or overhead costs incurred by the print supplier. In addition, the cost may include a fee for providing the brokering service. A designation of the cost may be provided 350 to the print requester computing device by, for example and without limitation, the broker computing device. In an embodiment, payment information for a print request may be received 355 from the print requester computing device. A credit may be provided 360 to the print supplier associated with the selected print supplier printing device upon performance of the print request on the print supplier printing device.

Figure 4:
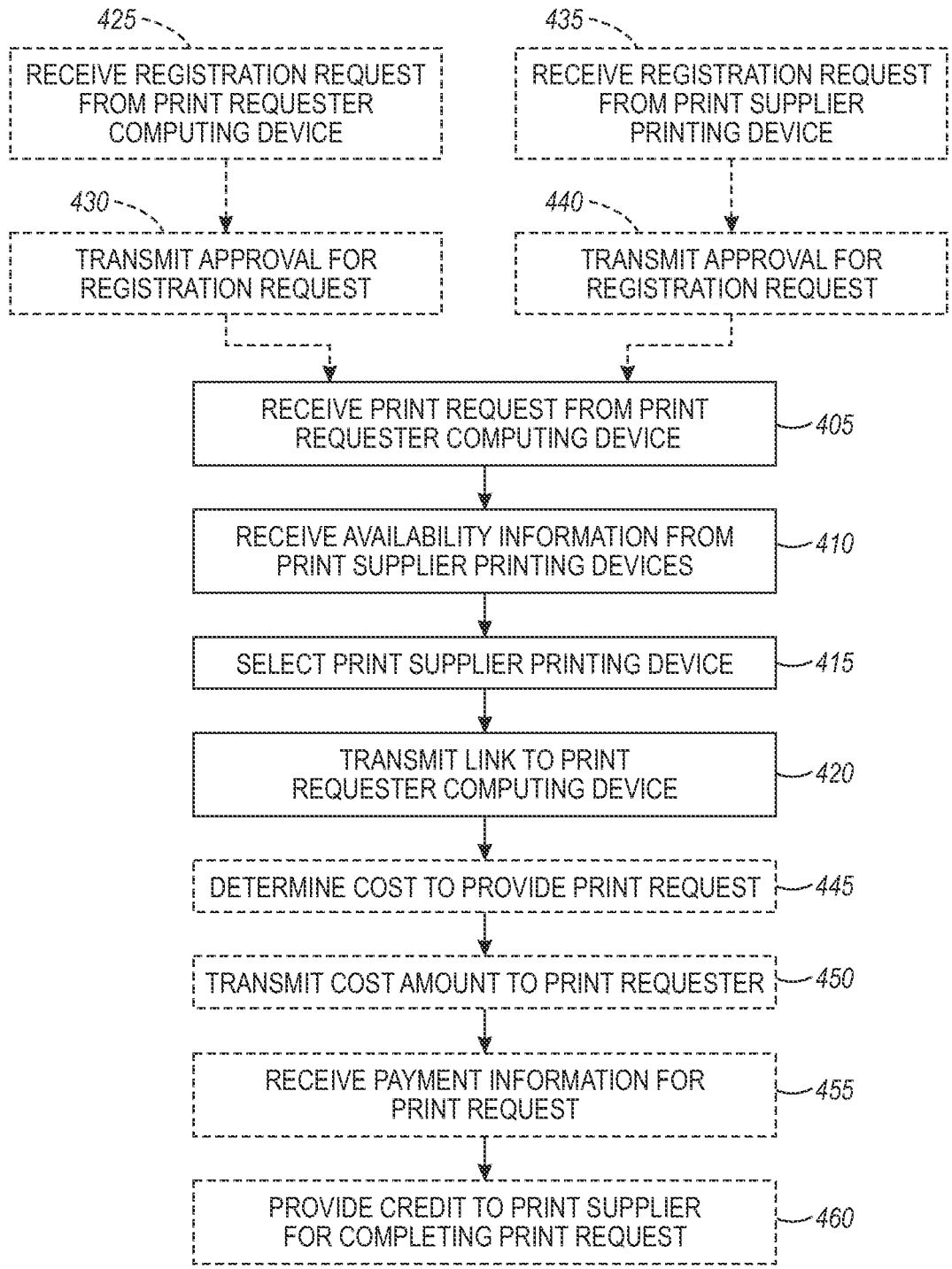

FIG. 4 depicts a flow diagram of an exemplary method of brokering printing device capacity according to an embodiment. As shown in FIG. 4, a print request may be received 405 by a broker computing device from a print requester computing device. The print request may include one or more print parameters. The one or more print parameters may include, for example and without limitation, a geographical location, a due date or time, a method of payment, a print job size, a print job quality, and one or more finishing options. In an embodiment, the geographical limitation may refer to one or more of a location of a print requester computing device, a location of a print requester, a location at which a print requester would like to receive one or more documents resulting from the print request, or a destination to which to ship one or more documents resulting from the print request. The due date or time may refer to a date or time by which the print request must be completed, delivered, received by the print requester and/or received at a destination. A method of payment may refer to a manner in which payment for processing and performing the print request will be made. In an embodiment, the print requester may pay an operator of the broker computing device. The print job size may refer to a number of impressions or pages for a print job. A print job quality may refer to a resolution, color/monochrome characteristic, a number of colors (3-color printing, 4-color printing, 6-color printing, etc.) or the like. The one or more finishing options may include spiral binding, stapling, hardback binding or the like.

Availability information may also be received 410 by the broker computing device from one or more print supplier printing devices. In an embodiment, the broker computing device may poll one or more print supplier printing devices. In an embodiment, the broker computing device may poll only print supplier printing devices that can satisfy the print parameters. In an embodiment, the broker computing device may store availability information received from print supplier printing device and compare the availability information with the print parameters when a print request is received 405. In an embodiment, availability information may pertain to excess capability for a print supplier printing device, available supplies, such as media, required ink or toner, and/or the like, an ability to meet specified quality metrics for the particular print request, whether the print supplier is equipped to handle one or more output requirements, such as shipping the resulting one or more documents to a third party, the relative time requirements for performing the print request, and/or the like. Alternate methods of determining availability of one or more print supplier printing devices may be performed within the scope of this disclosure.

One of the one or more print supplier printing devices may be selected 415 based on the one or more print parameters and the availability information for the selected print supplier printing device. In an embodiment, the broker computing device may provide a list of one or more of the one or more print supplier printing devices to the print requester and may receive a selection of one of the one or more print supplier printing devices from the print requester. The selection from the print requester may be used to select 415 the print supplier printing device. In an alternate embodiment, the broker computing device may automatically select 415 the print supplier printing device based on the print parameters and the availability information for the print supplier printing device without additional input from the print requester. Alternate methods of selecting a print supplier printing device may be performed within the scope of this disclosure.

A link for the selected print supplier printing device may be transmitted 420 by the broker computing device to the print requester computing device. The link may enable the print requester computing device to directly contact the print supplier printing device. In an embodiment, the link may correspond to an IP address or other designator for an internet-enabled print supplier printing device. Alternate links may also be used within the scope of this disclosure.

In an embodiment, a registration request may be received 425 by the broker computing device from a print requester computing device. The registration request may comprise a preferred payment method, one or more default user preferences and one or more preferred print suppliers. In an embodiment, the default user preferences may include one or more of a geographical location, a standard print job size, a default print job quality, and one or more default finishing options. An approval for the registration request may be transmitted 430 to the print requester computing device upon approval of the print requester as a valid user for the broker computing device service. In an embodiment, the approval may be transmitted 430 by the broker computing device.

In an embodiment, a registration request may be received 435 by the broker computing device from a print supplier associated with a print supplier printing device. The registration request may comprise one or more policies regarding use of the print supplier printing device. For example and without limitation, the print supplier may choose to register specific print supplier printing devices that will be made available to print requesters. As such, a list of printing devices may be provided to the broker computing device as part of the registration request. In addition, a print supplier may submit a number of policies for acceptance of a job, such as a maximum or minimum print job size or a range of print job sizes, a print job complexity which the print supplier printing device is able to process, one or more constraints (for example, constraints may include monochrome only, standard stock, no illicit or pornographic print materials, no finishing requirements other than staples, and/or any other constraint), hours of operation, public access points for pick up of completed print jobs, security algorithms, a block list of specific print requesters, a preferred payment method, one or more acceptable print job types, one or more methods of enabling a print requester to receive one or more documents resulting from a completed print job, and/or the like. An approval for the registration request may be transmitted 440 to the print supplier upon approval of the print supplier as a valid supplier for the broker computing device service. In an embodiment, the approval may be transmitted 440 by the broker computing device.

In an embodiment, a cost for the print request may be determined 445 based on the one or more print parameters. In an embodiment, the cost may be determined 445 by the broker computing device. The cost may account for the materials, wear and tear on a printing device and labor required to produce one or more documents for the print request. The cost may further include a cost of shipping the one or more documents to a receiving location or other shipping, handling or overhead costs incurred by the print supplier. In addition, the cost may include a fee for providing the brokering service. A designation of the cost may be provided 450 to the print requester computing device by, for example and without limitation, the broker computing device. In an embodiment, payment information for a print request may be received 455 from the print requester computing device. A credit may be provided 460 to the print supplier associated with the selected print supplier printing device upon performance of the print request on the print supplier printing device.

Other functions may also be provided to a print supplier or a print requester by the broker computing device. For example, the broker computing device may provide metrics to a print requester as to whether it would be more cost-effective to own a particular printing device rather than using the service provided by the broker. Such information may be provided based on, for example and without limitation, the type of print requests that the print requester has performed within a given time period, a purchase price for one or more printing devices required to perform such print requests and the up-front and continuing costs associated with maintaining such one or more printing devices.

In an embodiment, the operator of the broker computing device may provide accounting tools for taxes, reporting, benefit analysis and the like. In an embodiment, the broker may provide a business kit to help determine what is required to make a print supplier's printing devices accessible by print requesters via a computer network and how to organize a physical location for print requesters and other third parties to pick up documents resulting from the performance of a print request. In an embodiment, the broker may provide a kit to show how to manage the extra volume resulting from signing up as a print supplier, how to ship resulting documents in a cost-effective manner, how to establish relationships with shippers and other presentment partners, and how to handle documents containing secure data. Other information may also be provided to print suppliers within the scope of this disclosure.

The operator of the broker computing device may provide software to each print requester to enable the print requester to connect its devices to the broker computing device. For example, the print requester software may enable a print requester computing device to build a job ticket, perform optimal printing format conversion (if necessary), apply any other tools that the print requester may require or request and submit the print request to the broker computing device. The print requester software may further consider user preferences, such as internal policies (for example, some print jobs may be designated as containing business sensitive information that should not be sent to a "public" printer).

The operator of the broker computing device may further provide software to each print supplier to enable the print supplier to connect its devices to the broker computing device. In an embodiment, a print supplier printing device may be accessible to a broker computing device or a print requester computing device. In an alternate embodiment, a print supplier computing device may be accessible to a broker computing device or a print requester computing device. The print supplier computing device may then be in operable communication with a print supplier printing device. The print supplier software may respond to requests from a computing device, such as the broker computing device, to determine whether a print request can be accepted. Print parameters within the print request may be compared with print supplier preferences, availability information and the like to determine if the job can be accepted. In an embodiment, the print supplier software may provide such information to the broker computing device in response to receiving a print request.

Figure 5:
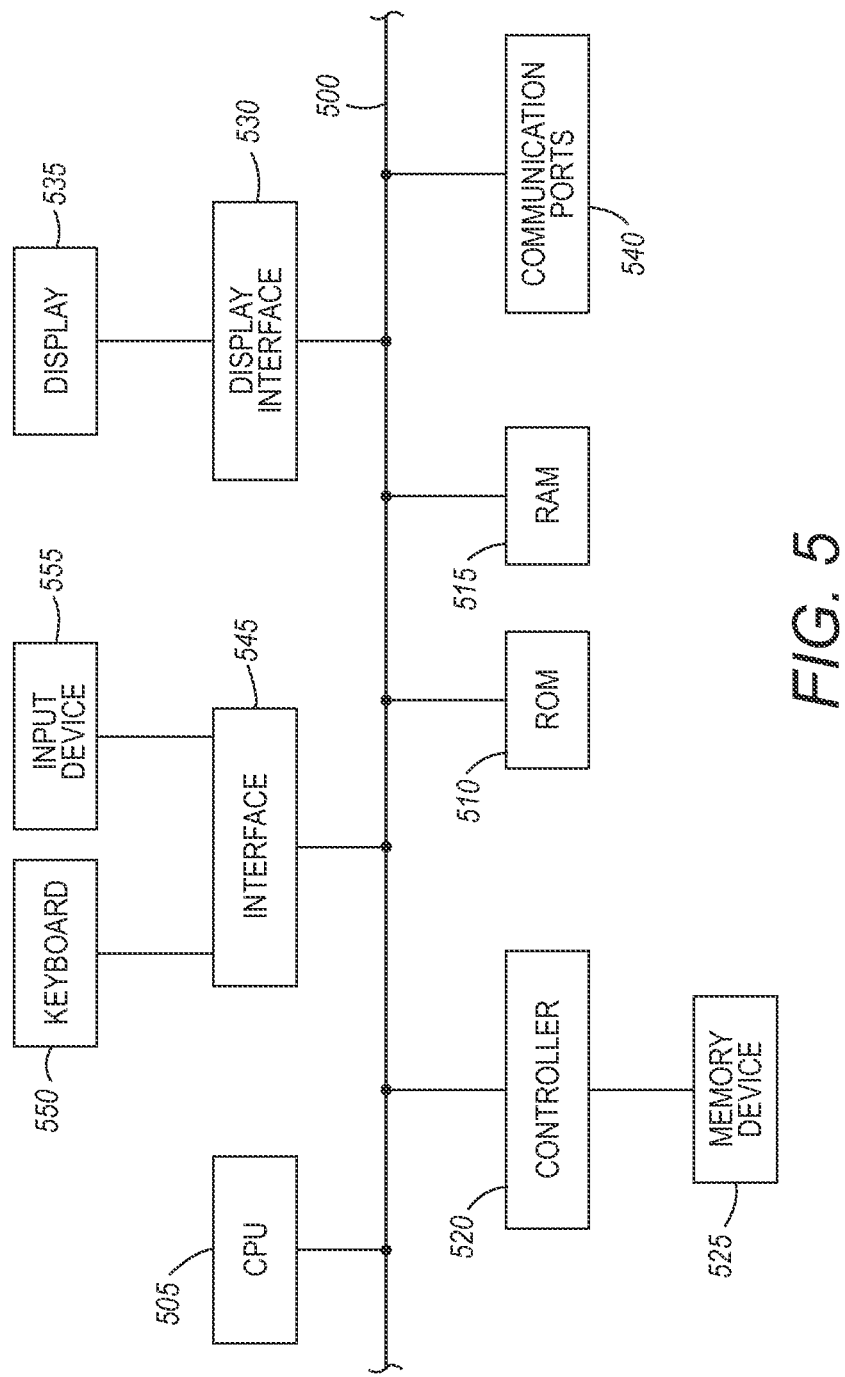
FIG. 5 depicts a block diagram of exemplary internal hardware that may be used to contain or implement program instructions according to an embodiment.

FIG. 5 depicts a block diagram of exemplary internal hardware that may be used to contain or implement program instructions, such as the process steps discussed above in reference to FIGS. 3 and 4, according to embodiments. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an exemplary processing device, computing device or processor as such terms are used within this disclosure. Read only memory (ROM) 510 and random access memory (RAM) 515 constitute exemplary memory devices or processor-readable storage media.

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-Ray™ disc, and/or other recording medium.

An optional display interface 530 may permit information from the bus 500 to be displayed on the display 535 in audio, visual, graphic or alphanumeric format. Communication with external devices, such as a printing device, may occur using various communication ports 540. An exemplary communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A broker computing system in operable communication with and remote from one or more print requester computing devices and one or more print supplier printing devices, wherein the one or more print supplier printing devices are remote from the one or more print requester computing devices, wherein each print supplier printing device is associated with a print supplier, wherein the broker computing system comprises: a processor; and a processor-readable storage medium in operable communication with the processor, wherein the processor-readable storage medium contains one or more programming instructions that, when executed, cause the processor to:

receive a print request from a print requester computing device, wherein the print request comprises one or more print parameters, transmit a poll request to a plurality of print suppliers, the poll request comprising the one or more print parameters of the print request, in response to the poll request, receive availability information from a plurality of print supplier printing devices, select a print supplier printing device from the plurality of print supplier devices based on the one or more print parameters and the availability information for the selected print supplier printing device, transmit a link for the selected print supplier printing device to the print requester computing device, wherein the link enables the print requester computing device to directly contact the print supplier printing device, receive payment from the print requester for processing the print request, and transfer at least a portion of the payment to the print supplier associated with the selected print supplier printing device, wherein the link corresponds to an address for the print supplier printing device, wherein the link enables the print requester to transmit a print job corresponding to the print request to the print supplier such that the print job is not received by the broker computing device but instead is sent directly from the print requester computing device to the print supplier printing device via the link.

2. The broker computing system of claim 1 wherein the one or more programming instructions further comprise one or more programming instructions that, when executed, cause the processor to:

receive a registration request for a print requester from a print requester computing device, wherein the registration request comprises a payment method, one or more user preferences and one or more preferred print suppliers; and transmit an approval for the registration request to the print requester computing device.

3. The broker computing system of claim 1 wherein the one or more programming instructions further comprise one or more programming instructions that, when executed, cause the processor to:

receive a registration request from a print supplier associated with a print supplier printing device, wherein the registration request comprises one or more policies regarding use of the print supplier's associated print supplier printing device; and transmit an approval for the registration request to the print supplier.

4. The broker computing system of claim 3, wherein the registration request comprises at least one of the following print policies:

one or more acceptable print job types,
a range of acceptable print job sizes,
a print job complexity,
hours of operation,
geographical constraints,
preferred payment methods,
a list of restricted print requesters, or
one or more methods of enabling a print requester to receive one or more documents resulting from a completed print job; and wherein the one or more instructions to select a print supplier printing device from the plurality of print supplier printing devices comprise instructions that, when executed, cause the processor to select as the selected print supplier printing device, one of the print supplier printing devices having policies that match one or more user preferences of the print requester.

5. The broker computing system of claim 3, wherein the processor-readable storage medium further comprises one or more instructions that, when executed, cause the processor to: before transmitting the approval for the registration request, qualify the print supplier by verifying that the print supplier's associated print supplier printing device can reliably provide print-related services to print requestors.

6. The broker computing system of claim 1 wherein the one or more programming instructions further comprise one or more programming instructions that, when executed, cause the processor to:

determine a cost for the print request based on the one or more print parameters;

transmit the cost to the print requester computing device; and provide a credit to the print supplier associated with the selected print supplier printing device for performing the print request on the print supplier printing device.

7. The broker computing system of claim 1, wherein the link corresponds to an Internet Protocol address for the print supplier printing device.

8. The broker computing system of claim 1, wherein the processor-readable storage medium further comprises one or more instructions that, when executed, cause the processor to:
   determine whether or not it would be cost-effective to own a printing device based on information comprising at least one of the following:
      a type of print requests that the print requester has performed within a predetermined period of time,
      a purchase price for one or more printing devices required to perform the type of print requests, or
      up-front and continuing costs for maintaining the one or more printing devices; and
   provide a recommendation to the print requester based on the determination.

9. A method of brokering printing device capacity, the method comprising:
   receiving a print request from a print requester computing device, wherein the print request comprises one or more print parameters;
   transmitting a poll request to a plurality of print suppliers, the poll request comprising the one or more print parameters of the print request;
   in response to the poll request, receiving availability information from a plurality of print supplier printing devices;
   selecting, by a broker computing device, one of the plurality of print supplier printing devices based on the one or more print parameters and the availability information for the selected print supplier printing device; and
   transmitting a link for the selected print supplier printing device to the print requester computing device, wherein the link enables the print requester computing device to directly contact the print supplier printing device;
   receiving payment from the print requester for processing the print request; and
   transferring at least a portion of the payment to the print supplier associated with the selected print supplier printing device,
   wherein the link corresponds to an address for the print supplier printing device,
   wherein the link enables the print requester to transmit a print job corresponding to the print request to the print supplier such that the print job is not received by the broker computing device but instead is sent directly from the print requester computing device to the print supplier printing device via the link.

10. The method of claim 9, further comprising:
    receiving a registration request for a print requester from a print requester computing device, wherein the registration request comprises a payment method, one or more user preferences and one or more preferred print suppliers; and
    transmitting an approval for the registration request to the print requester computing device.

11. The method of claim 9, further comprising:
    receiving a registration request from a print supplier associated with a print supplier printing device, wherein the registration request comprises one or more policies regarding use of the print supplier's associated print supplier printing device; and
    transmitting an approval for the registration request to the print supplier.

12. The method of claim 11, wherein the registration request comprises at least one of the following print policies:
    one or more acceptable print job types,
    a range of acceptable print job sizes,
    a print job complexity,
    hours of operation,
    geographical constraints,
    preferred payment methods,
    a list of restricted print requesters, or
    one or more methods of enabling a print requester to receive one or more documents resulting from a completed print job; and
    wherein selecting one of the plurality of print supplier printing devices further comprises, by the broker computing device selecting as the selected print supplier printing device, one of the print supplier printing devices having policies that match one or more user preferences of the print requester.

13. The method of claim 11, further comprising, before transmitting the approval for the registration request, qualifying the print supplier by verifying that the print supplier's associated print supplier printing device can reliably provide print-related services to print requestors.

14. The method of claim 11 wherein the one or more policies regarding use of the print supplier printing device comprise one or more the following:
    one or more acceptable print job types;
    a range of acceptable print job sizes;
    hours of operation;
    a list of restricted print requesters; and
    one or more methods of enabling a print requester to receive one or more documents resulting from a completed print job.

15. The method of claim 9, further comprising:
    determining a cost for the print request based on the one or more print parameters;
    transmitting the cost to the print requester computing device; and
    providing a credit to the print supplier associated with the selected print supplier printing device for performing the print request on the print supplier printing device.

16. The method of claim 9 wherein the one or more print parameters comprise one or more of the following:
    a geographical location;
    a due date or time;
    a method of payment;
    a print job size;
    a print job quality;
    a list of excluded print suppliers; and
    one or more finishing options.

17. The method of claim 9, wherein the link corresponds to an Internet Protocol address for the print supplier printing device.

18. The method of claim 9, further comprising:
    determining whether or not it would be cost-effective to own a printing device based on information comprising at least one of the following:
       a type of print requests that the print requester has performed within a predetermined period of time,
       a purchase price for one or more printing devices required to perform the type of print requests, or
       up-front and continuing costs for maintaining the one or more printing devices; and providing a recommendation to the print requester based on the determining.

* * * * *